(12) United States Patent
Warkomski et al.

(10) Patent No.: US 7,043,345 B2
(45) Date of Patent: May 9, 2006

(54) SYSTEM AND METHOD WITH ADAPTIVE ANGLE-OF-ATTACK AUTOPILOT

(75) Inventors: Edward J. Warkomski, Tucson, AZ (US); Keith D. Myers, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 336 days.

(21) Appl. No.: 10/683,518

(22) Filed: Oct. 10, 2003

(65) Prior Publication Data

US 2005/0278085 A1   Dec. 15, 2005

(51) Int. Cl.
*G01C 21/00* (2006.01)
*G06F 15/18* (2006.01)

(52) U.S. Cl. .......................................... 701/6; 244/181
(58) Field of Classification Search .................... 701/1, 701/4, 5, 6, 7, 13; 244/181, 178, 194, 223, 244/227, 228
See application file for complete search history.

(56) References Cited

U.S. PATENT DOCUMENTS

| | | | | |
|---|---|---|---|---|
| 4,234,142 A | * | 11/1980 | Yost et al. | 244/3.21 |
| 4,769,759 A | * | 9/1988 | McGough | 701/6 |
| 6,073,065 A | * | 6/2000 | Brown et al. | 701/36 |
| 6,131,055 A | * | 10/2000 | Patrick | 701/6 |
| 6,273,370 B1 | * | 8/2001 | Colgren | 244/181 |
| 6,325,333 B1 | * | 12/2001 | Najmabadi et al. | 244/181 |

* cited by examiner

*Primary Examiner*—Richard M. Camby
(74) *Attorney, Agent, or Firm*—Thomas J. Finn; Leonard A. Alkov; Karl A. Vick

(57) ABSTRACT

A control system includes a rate-damping loop that uses a calculated angle-of attack error to non-linearly scale a rate-feedback signal so that at lower angle-of attack (AOA) error values, an acceleration feedback term plays a greater role in pitch compensation, while at greater angle-of-attack error values, a rate-feedback term plays a greater role in the pitch compensation. In some embodiments, a control system and method of controlling an angle-of-attack of a moving body are provided. A signal representing an angle-of-attack error is non-linearly combined with a signal representing a rate-of-change of an estimated angle-of-attack to generate a non-linear rate-damping signal. The non-linear rate-damping signal is subtracted from the signal representing the angle-of-attack error to generate a signal to control one or more elements of the moving body.

24 Claims, 3 Drawing Sheets

SYSTEM AND METHOD WITH ADAPTIVE ANGLE-OF-ATTACK AUTOPILOT

TECHNICAL FIELD

Embodiments of the present invention pertain to guidance and flight-control systems for moving bodies such as aircraft, spacecraft, missiles, and guided projectiles, and to methods for controlling angle-of-attack for such systems.

BACKGROUND

Conventional autopilot systems are used control inertial orientations (e.g., pitch and yaw attitudes) of an aircraft or missile. Some of these control systems control the angle-of-attack (AOA) (i.e., alpha) using alpha and its non-linear derivatives in a feedback loop. One problem with conventional control systems is that the use of these non-linear terms cause many control difficulties, even when sophisticated control systems and multi-variable feedback schemes are implemented. Another problem with conventional control systems is that it is difficult to achieve system stability over a wide range of mach numbers and turbulence levels. Another problem is that conventional control-system activation requirements may result in increased trim drag and power consumption. Another problem with conventional control systems is that it is difficult to accurately control a steady-state angle-of-attack, especially over a wider range of system rise times, overshoot levels, and body rates.

Thus there are general needs for systems and methods that provide improved control of airframe angle-of-attack. There are also needs for control systems and methods that provide increased system stability over a wide range of mach numbers and turbulence levels. There are also needs for control systems and methods that may reduce control-system activation time helping to reduce trim drag and battery drain or power consumption. There are also needs for control systems and methods that can provide for more accurate control of a steady-state angle-of-attack.

SUMMARY

A control system includes a rate-damping loop that uses a calculated angle-of attack error to non-linearly scale a rate-feedback signal so that at lower angle-of attack (AOA) error values, an acceleration feedback term may play a greater role in pitch compensation, while at greater angle-of-attack error values, a rate-feedback term may play a greater role in the pitch compensation.

In some embodiments, a method of controlling an angle-of-attack of a moving body is provided. The method comprises non-linearly combining a signal representing an angle-of-attack error with a signal representing a rate-of-change of an estimated angle-of-attack to generate a non-linear rate-damping signal. The non-linear rate-damping signal is subtracted from the signal representing the angle-of-attack error to control one or more elements of the moving body.

In some embodiments, a control system for controlling angle-of-attack for a moving body is provided. The control system comprises a non-linear combining circuit element, which is part of a non-linear rate damping loop, for non-linearly combining a signal representing an angle-of-attack error with a signal representing a rate-of-change of an estimated angle-of-attack to generate a non-linear rate-damping signal. The control system also comprises a subtraction circuit element for subtracting the non-linear rate-damping signal from the signal representing the angle-of-attack error to generate a signal for controlling one or more elements of the moving body.

In some embodiments, a product of the signal representing the angle-of-attack error and the signal representing a rate-of-change of the estimated angle-of-attack may be raised to an exponent to generate the non-linear rate-damping signal. In some embodiments, a second derivative of the angle-of-attack error may also be used to control the one or more elements of the moving body. In some embodiments, the estimated angle-of-attack may be subtracted from a desired angle-of-attack to generate the signal representing the angle-of-attack error.

In some embodiments, the present invention provides an airframe. The airframe may be part of an aircraft, a spacecraft, a missile or a guided projectile. In these embodiments, the airframe comprises a control system to control an angle-of attack by non-linearly combining a signal representing an angle-of-attack error with a signal representing a rate-of-change of an estimated angle-of-attack to generate a non-linear rate-damping signal. The control system may subtract the non-linear rate-damping signal from the signal representing the angle-of-attack error to generate a signal to controlling one or more elements of the airframe. In these embodiments, the airframe may also comprise an airframe-state estimator which generates, among other things, the estimated angle-of-attack and the rate-of-change of the estimated angle-of-attack from sensors.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

In embodiments, the control systems and methods of the present invention may provide for improved control of airframe pitch. In these embodiments, the acceleration feedback term of an angle-of-attack estimate plays a greater role in pitch compensation at lower angle-of-attack error values, while allowing the rate-feedback term of the angle-of-attack estimate to play a greater role in the pitch compensation at greater angle-of-attack error values. In some embodiments, the control systems and methods of the present invention may provide increased system stability over a wide range of mach numbers and turbulence levels, while reducing and/or eliminating mach-dependent gain tables. In some embodiments, the control systems and methods of the present invention may also significantly reduce control system activation time (e.g., with or without turbulence) thereby reducing trim drag and battery drain or power consumption. In some embodiments, the control systems and methods of the present invention may also provide for more accurate control of the steady-state angle-of-attack over a wider range of feasible system rise times, overshoot levels, and body rates.

Figure 1:
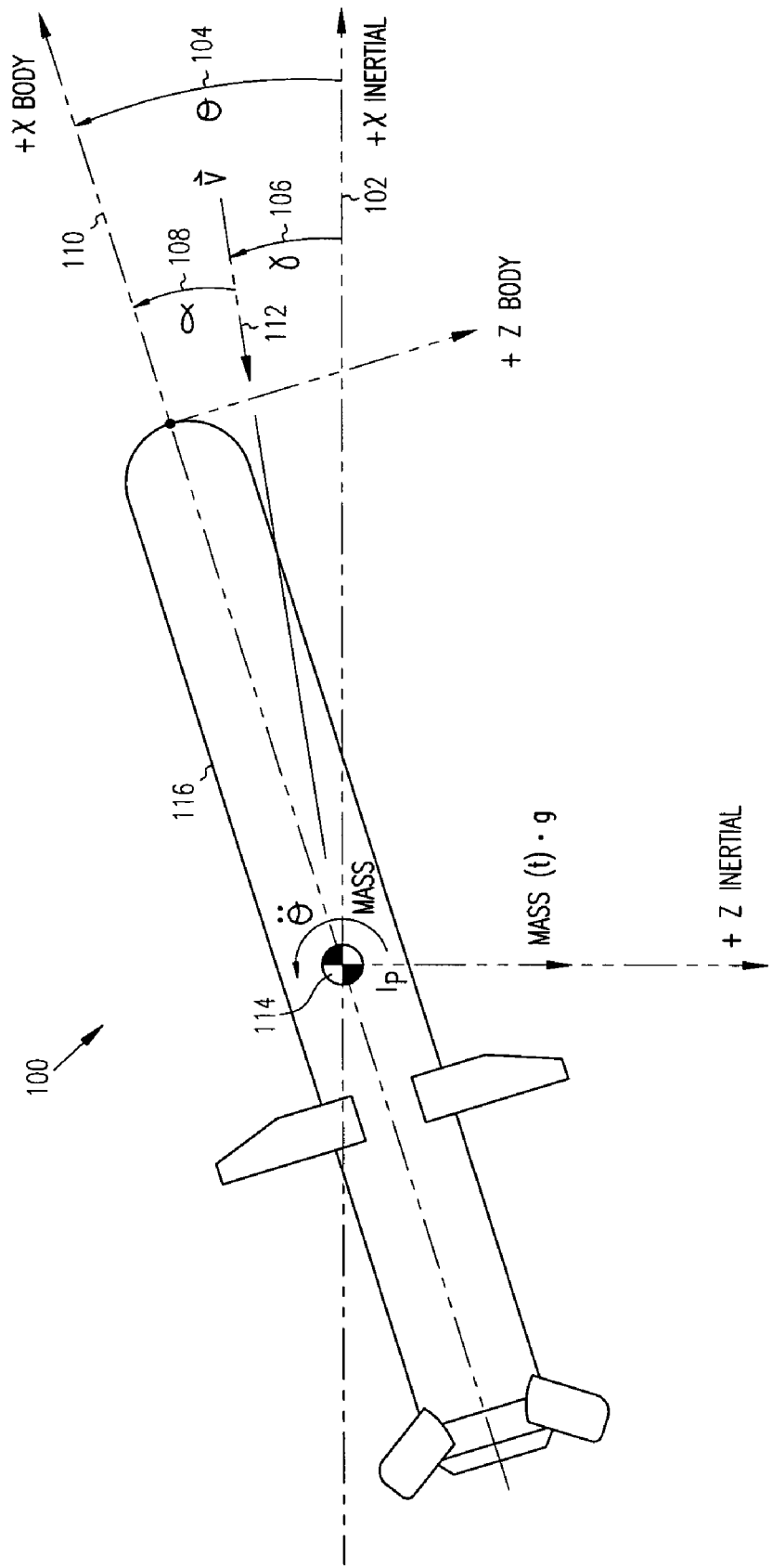
FIG. 1 illustrates an airframe within a coordinate system in accordance with embodiments of the present invention.

FIG. 1 illustrates an airframe within a coordinate system in accordance with embodiments of the present invention. Coordinate system 100 illustrates moving body 116 having center-of-gravity 114 moving in a direction of flight-path vector 112. The direction of flight-path vector 112 may be at flight-path angle (e.g., gamma ($\gamma$)) 106, which may be measured with respect to a reference, such as horizon 102. Center-of-gravity 114 of moving body 116 may also have velocity and/or acceleration vector 110, which may result from thrust provided by moving body 116. Velocity/acceleration vector 110 may be at body angle (e.g., theta ($\theta$)) 104, which also may be measured with respect to a reference, such as horizon 102. Angle-of-attack (e.g., alpha ($\alpha$)) 108 may be a difference between flight-path angle 106 and body angle 104. In some embodiments, angle-of-attack 108 may be determined by subtracting flight-path angle 106 from body angle 104. Moving body 116 may be an airframe or other moving body including aircraft, spacecraft, missiles, unmanned aerial vehicles (UAVs) and guided projectiles. In some embodiments, moving body 116 may be ground based moving vehicle such as an automobile.

In embodiments, an airframe may have a desired angle-of-attack which it may wish to maintain depending on its velocity, acceleration and/or thrust. For example, for greater velocities, a smaller angle-of-attack may be desired, while for lower velocities, a greater angle-of-attack may be desired.

In accordance with embodiments of the present invention, control systems and methods of controlling angle-of-attack 108 of moving body 116 are provided. In some embodiments, a control system includes a rate-damping loop that uses a calculated angle-of-attack error to non-linearly scale a rate-feedback signal so that at lower angle-of-attack error values, an acceleration feedback term plays a greater role in pitch compensation, while at greater angle-of-attack error values the rate-feedback term plays a greater role in the pitch compensation. This is described in more detail below.

Figure 2:
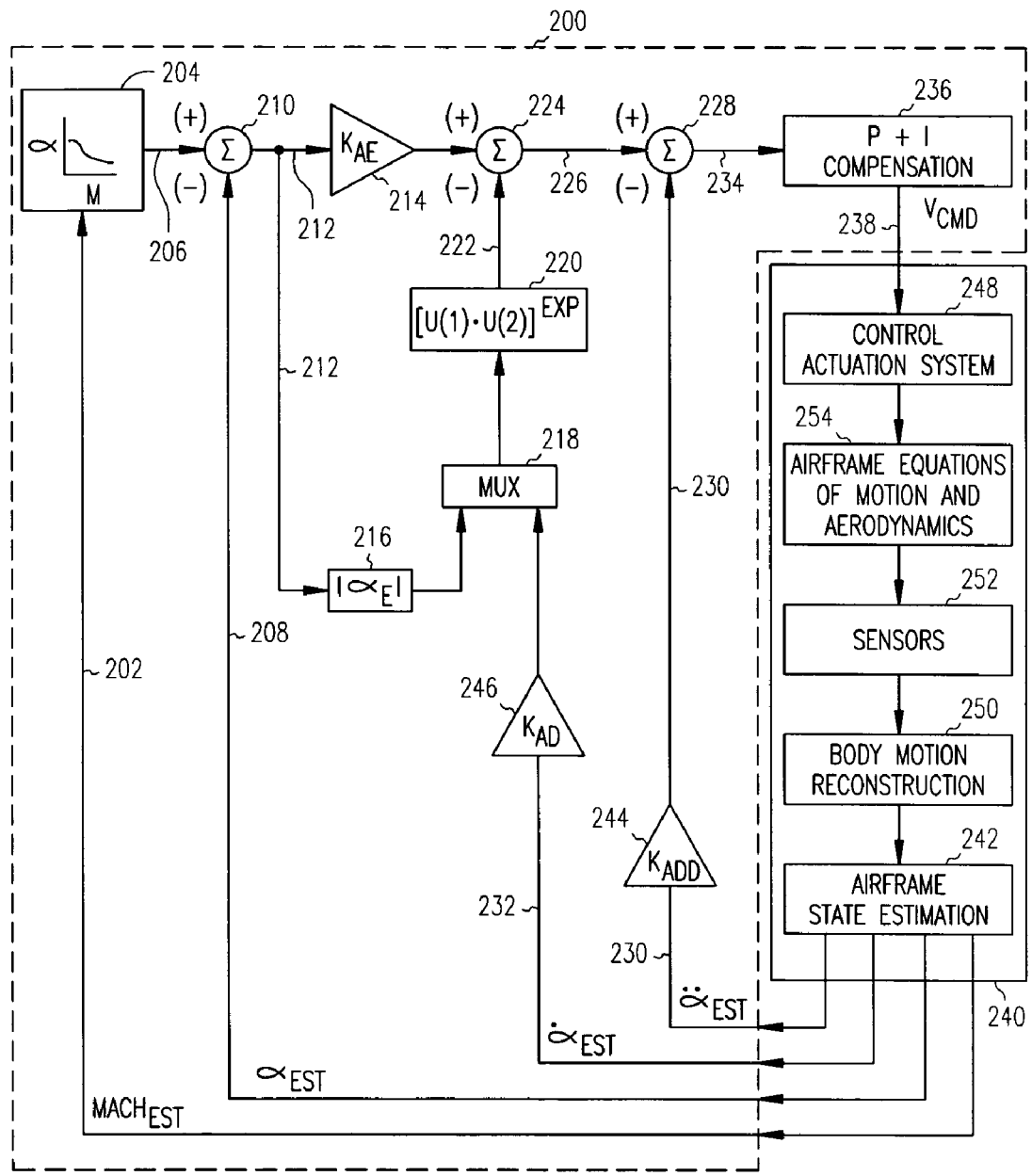
FIG. 2 is a functional block diagram of a control system along with other system elements in accordance with embodiments of the present invention.

FIG. 2 is a functional block diagram of a control system along with other system elements in accordance with embodiments of the present invention. Control system 200 and system elements 240 may be part of any moving body, such as moving body 116 (FIG. 1), which may have guidance and/or control systems to assist with flight control. In general, control system 200 receives airframe-state estimates from system elements 240 for use by control system 200 as part of one or more feedback loops to generate control signal 238. The control signal may be used by system elements 240 for, among other things, pitch control.

Control system 200 may include non-linearly combining circuit element 220 to non-linearly combine signal 212 representing an angle-of-attack error with signal 232 representing a rate-of-change of an estimated angle-of-attack to generate signal 222. Signal 222 may be viewed as a non-linear rate-damping signal. Control system may include subtraction circuit element 224 to subtract signal 222 from signal 212 to generate signal 226 for use in controlling one or more system elements of the moving body.

In some embodiments, control system 200 may include subtraction circuit element 228 to subtract signal 230 representing a rate-of-change of signal 232 from signal 226 to generate control signal 234 for controlling the one or more elements 240 of the moving body. In some cases, control signal 234 may be used to control the one or more elements of the moving body to affect pitch of the moving body.

In some embodiments, control system may include subtraction circuit element 210 for subtracting estimated angle-of-attack 208 from desired angle-of-attack 206 to generate signal 212 to represent the angle-of-attack error. In some embodiments, non-linear combining circuit element 220 may raise a product of signals 212 and 232 (illustrated as the product of signals u1 and u2) to an exponent to generate signal 222, although the scope of the invention is not limited in this respect. The exponent may range from 0.1 to up to 10 and greater depending on system elements including the various weighting values.

In some embodiments, system 200 may further comprise compensation circuit element 236 to apply proportional-plus-integral (P+I) compensation to control signal 234 to generate a command signal which may be command voltage 238.

In some embodiments, system 200 may also comprise element 204 which may provide desired angle-of-attack 206 from an estimated velocity of the moving body. The estimated velocity may, for example, comprise a mach estimate 202, although the scope of the invention is not limited in this respect. In some embodiments, element 204 may comprise a command table which provides desired angle-of-attacks for various mach estimates, while in other embodiments, element 204 may mathematically generate a desired angle-of-attack based on a velocity or mach estimate. In some embodiments, estimated angle-of-attack 208 may correspond to angle-of-attack 108 (FIG. 1) which may be a difference between flight-path angle 106 (FIG. 1) and body angle 104 (FIG. 1) of moving body 116 (FIG. 1).

In some embodiments, control system 200 may include multiplication circuit element 214 to scale and/or multiply signal 212 by a first weighting value (e.g., $K_{AE}$) prior to subtracting signal 222 from signal 212 in circuit element 224. Control system 200 may also include multiplication circuit element 246 to scale and/or multiply signal 232 by a second weighting value (e.g., $K_{AD}$) prior to non-linearly combining signals 232 and 212 in circuit element 220. Control system 200 may also include multiplication circuit element 244 to scale and/or multiply signal 230 by a weighted value (e.g., $K_{ADD}$) prior to subtracting signal 230 from signal 226 in circuit element 228. The weighting values may be predetermined during system alignment or may be dynamically adjusted. The weighting values may range from 0.1 to up to 100 and even greater. In embodiments, the weighting values may be initially estimated based on a particular airframe or system and then tuned.

In some embodiments, control system 200 may include absolute-value circuit element 216 to provide the magnitude of signal 212 prior to non-linearly combining with signal 232 in circuit element 220. In some embodiments, control system 200 may include multiplexer circuit element (MUX) 218 to multiplex signals 212 and 232 prior to the operation of non-linear combining circuit element 220.

In some embodiments, signals 212, 232, 222, 226, and 230 may comprise vectors, and the first, second and third weighted values may be scalars having predetermined values. The values may be selected based on airframe and system characteristics. In embodiments, the values may be initially estimated based on a particular airframe or system, and then tuned and further adjusted.

Signal 222 may be a non-linear rate-damping signal that is generated as part of a rate-damping loop and may represent a non-linearly weighted rate-of-change of the estimated angle-of-attack. Signal 226 may be an error signal that includes the non-linearly weighted effect of the rate-damping signal. Signal 230 may represent the rate-of-change of the rate-of-change of estimated angle-of-attack 208, the rate-of-change of signal 232 (e.g. a second derivative of signal 208) or the acceleration of estimated angle-of-attack 208 that may be generated as part of an acceleration-damping loop.

Control system 200 may receive mach estimate 202, estimated angle-of-attack 208, signal 232 and signal 230 from airframe-state estimator 242, which may be part of system elements 240. In some embodiments, airframe-state estimator 242 may receive input from body motion reconstruction element 250 which reconstructs the motion of an airframe from input provided by sensors 252. Airframe equations of motion and aerodynamics elements 254 may generate input from sensors 252. In some embodiments, the airframe state estimations from airframe-state estimator 242 may be computed from data received by aircraft state sensors 252 such as gyros, rate gyros, control fin position, seeker gimbal angle and angle rate, and inertial measurement units (IMUs). Different airframes may have a different set of sensors depending on size and cost. System elements 240 may use the data from sensors 252 along with known information from airframe equations of motion and aerodynamics elements 254 to determine current airframe body motion, which may then be transformed into body angles and rates information.

The control signal (e.g., signal 234 or command voltage 238 (e.g., Vcmd)) provided by control system 200 may be used by system elements 240, such as actuator system 248 for, among other things, pitch control. Because the rate-damping loop uses a calculated angle-of-attack error (e.g., signal 212) to non-linearly scale rate-feedback signal 232, an acceleration-feedback term (e.g., signal 230) may play a greater role in pitch compensation at lower angle-of-attack error values, while at greater angle-of-attack error values, a rate-feedback term (e.g., signal 232) may play a greater role in the pitch compensation.

Although control system 200 and system elements 240 are illustrated as having several separate functional and circuit elements, one or more of the functional and circuit elements may be combined and may be implemented by combinations of hardware and software-configured elements, such as processing elements including digital signal processors (DSPs), and/or other hardware elements. For example, in some embodiments, subtraction circuit elements 210, 224 and 228, multiplication circuit elements 214, 244 and 246, non-linear combining circuit element 220, absolute-value circuit element 216 and multiplexer circuit element 218 may be comprised of logic circuitry and/or firmware, while in other embodiments, these functional elements may be comprised of software-configured elements including processing elements. Processing elements may comprise one or more microprocessors, DSPs, application specific integrated circuits (ASICs), and combinations of various hardware and logic circuitry for performing at least the functions described herein.

Figure 3:
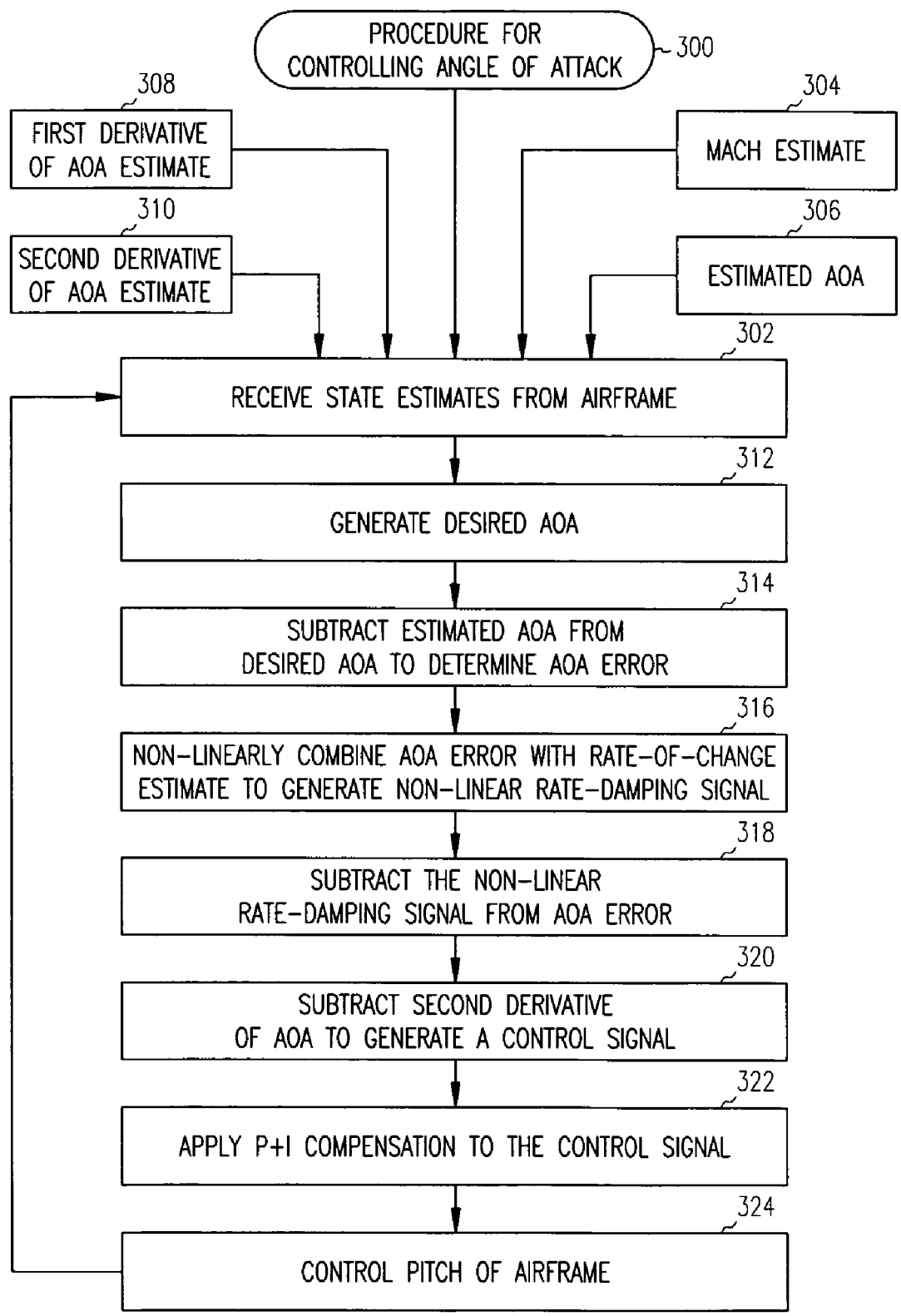
FIG. 3 is a flow chart of a procedure for controlling angle-of-attack in accordance with embodiments of the present invention.

FIG. 3 is a flow chart of a procedure for controlling angle-of-attack in accordance with embodiments of the present invention. Procedure 300 may be performed by a control system, such as control system 200 (FIG. 2), although other control systems may also be used for performing procedure 300. In general, procedure 300 may be used to help control an angle-of-attack of a moving body by providing a control signal which is generated based on state estimates received for the moving body.

Operation 302 receives state estimates from an airframe-state estimator. The state estimates may include mach estimate 304 which may correspond to mach estimate 202 (FIG. 2), estimated angle-of-attack error 306, which may correspond to estimated angle-of-attack 208 (FIG. 2), first derivative 308 of the estimated angle-of-attack which may correspond to signal 232 (FIG. 2), and second derivative 310 of the estimated angle-of-attack which may correspond to signal 230 (FIG. 2).

Operation 312 generates a desired angle-of-attack from a mach or velocity estimate, which may correspond to desired angle-of-attack 206 (FIG. 2). Operation 312 may, for example, utilize a command table or mathematical functions to generate the desired angle-of-attack from the mach or velocity estimate. Operation 314 subtracts the estimated angle-of-attack from the desired angle-of-attack to determine an angle-of-attack error, which may correspond to signal 212 (FIG. 2).

Operation 316 may non-linearly combine the signal representing the angle-of attack error with the signal representing the rate-of-change of the estimated angle-of-attack (e.g., first derivative 308) to generate a non-linear rate-damping signal, which may correspond to signal 222 (FIG. 2). Operation 318 subtracts the non-linear rate-damping signal from the signal representing the angle-of-attack error to generate a signal, which may be an error signal that includes a weighted effect of the rate-damping signal. In some embodiments, this signal may be used to control the pitch of a moving body. The signal generated by operation 318 may correspond to signal 226 (FIG. 2).

In some embodiments, operation 320 subtracts the signal representing a rate-of-change of second derivative 310 from the signal generated in operation 318 to generate a control signal for use in controlling the one or more elements of the moving body. The control signal generated in operation 320 may correspond to signal 234 (FIG. 2). Operation 324 may apply proportional-plus-integral (P+I) compensation to the control signal to generate a command voltage prior to use by system elements of the moving body.

As illustrated, the operations procedure 300 may be repeated and performed on a substantially continual basis as an airframe is in motion as part of a feedback system which may help keep the angle-of-attack error minimized. Although the individual operations of procedure 300 are illustrated and described as separate operations, one or more of the individual operations may be performed concurrently and nothing requires that the operations be performed in the order illustrated.

Thus, control systems and methods have been described in which acceleration feedback of the angle-of-attack estimate may play a greater role in pitch compensation at lower angle-of-attack error values, while allowing the rate feedback of the angle-of-attack estimate to play a greater role in the pitch compensation at greater angle-of-attack error values.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method of controlling an angle-of-attack of a moving body comprising:
   non-linearly combining a first signal representing an angle-of-attack error with a second signal representing a rate-of-change of an estimated angle-of-attack to generate a third signal, the third signal being a non-linear rate-damping signal; and
   subtracting the third signal from the first signal to generate a fourth signal for controlling one or more elements of the moving body.

2. The method of claim 1 further comprising subtracting a fifth signal representing a rate-of-change of the second signal from the fourth signal to generate a control signal for controlling the one or more elements of the moving body.

3. The method of claim 2 further comprising subtracting the estimated angle-of-attack from a desired angle-of-attack to generate the first signal to represent the angle-of-attack error.

4. The method of claim 1 wherein non-linear combining comprises raising a product of the first and second signals to an exponent to generate the third signal.

5. The method of claim 2 further comprising using the control signal to control the one or more elements of the moving body to affect pitch of the moving body.

6. The method of claim 2 further comprising applying proportional-plus-integral compensation to the control signal to control the one or more elements of the moving body.

7. The method of claim 3 wherein the desired angle-of-attack is determined from an estimated velocity of the moving body, and
   wherein the angle-of-attack is a difference between a flight-path angle and a body angle of the moving body.

8. The method of claim 3 wherein the desired angle-of-attack is determined using a command table which provides desired angle-of-attacks for various mach estimates, and
   wherein the angle-of-attack is a difference between a flight-path angle and a body angle of the moving body.

9. The method of claim 3 further comprising:
   multiplying the first signal by a first weighting value prior to subtracting the third signal from the first signal;
   multiplying the second signal by a second weighting value prior to non-linearly combining the first and second signals; and
   multiplying the fifth signal by a third weighted value prior to subtracting the fifth signal from the fourth signal, and
   wherein non-linearly combining comprises non-linearly combining an absolute value the first signal with the second signal.

10. The method of claim 9 wherein the first, second, third, fourth and fifth signals are vectors, and the first, second and third weighted values are scalars having predetermined values.

11. The method of claim 3 wherein;
    the third signal is generated as part of a rate-damping loop, the third signal representing a non-linearly weighted rate-of-change of the estimated angle-of-attack,
    the fourth signal is an error signal that includes a weighted effect of the non-linear rate-damping signal, and
    the fifth signal represents a second derivative of the estimated angle-of-attack and is generated as part of an acceleration-damping loop.

12. The method of claim 3 further comprising:
    receiving a mach estimate from an airframe-state estimator for determining the desired angle-of-attack;
    receiving the estimated angle-of-attack from the airframe-state estimator;
    receiving the second signal representing the rate-of-change of the estimated angle-of-attack from the airframe-state estimator; and
    receiving the fifth signal representing the rate-of-change of the second signal from the airframe-state estimator.

13. The method of claim 12 wherein the moving body is an airframe comprising one of an aircraft, spacecraft, missile or guided projectile.

14. A control system for controlling angle-of-attack for a moving body comprising:
    a non-linear combining circuit for non-linearly combining a first signal representing an angle-of-attack error with a second signal representing a rate-of-change of an estimated angle-of-attack to generate a third signal, the third signal being a non-linear rate-damping signal; and
    a subtraction circuit for subtracting the third signal from the first signal to generate a fourth signal for controlling one or more elements of the moving body.

15. The control system of claim 14 wherein the subtraction circuit is a first subtraction circuit, and wherein the control system further comprises a second subtraction circuit for subtracting a fifth signal representing a rate-of-change of the second signal from the fourth signal to generate a control signal for controlling the one or more elements of the moving body.

16. The control system of claim 15 further comprising a third subtraction circuit for subtracting the estimated angle-of-attack from a desired angle-of-attack to generate the first signal to represent the angle-of-attack error, and
    wherein the non-linear combining circuit raises a product of the first and second signals to an exponent to generate the third signal.

17. The control system of claim 16 further comprising multiplication circuits which:
    multiply the first signal by a first weighting value prior to subtracting the third signal from the first signal;
    multiply the second signal by a second weighting value prior to non-linearly combining the first and second signals; and
    multiply the fifth signal by a third weighted value prior to subtracting the fifth signal from the fourth signal, and
    and wherein the non-linear combining circuit non-linearly combines an absolute value of the first signal with the second signal.

18. The control system of claim 16 wherein:
    the third signal is a non-linear rate-damping signal and is generated as part of a rate-damping loop, the third signal representing a non-linearly weighted rate-of-change of the estimated angle-of-attack;
    the fourth signal is an error signal that includes a weighted effect of the non-linear rate-damping signal; and the fifth signal represents a second derivative of the estimated angle-of-attack and is generated as part of an acceleration-damping loop.

19. The control system of claim 16 wherein the control system receives from an airframe-state estimator a mach estimate, the estimated angle-of-attack, the second signal representing a rate-of-change of the estimated angle-of-attack, and the fifth signal representing a rate-of-change of the second signal, and wherein the mach estimate is used by the control system for determining the desired angle-of-attack.

20. An airframe comprising:

a control system to control an angle-of-attack by non-linearly combining a first signal representing an angle-of-attack error with a second signal representing a rate-of-change of an estimated angle-of-attack to generate a third signal, the third signal being a non-linear rate-damping signal, and subtracting the third signal from the first signal to generate a fourth signal for controlling one or more elements of the airframe; and an airframe-state estimator which generates at least the second signal from sensors.

21. The airframe of claim 20 wherein the control system comprises circuitry to:

subtract a fifth signal representing a rate-of-change of the second signal from the fourth signal to generate a control signal for controlling the one or more elements of the moving body;

subtract the estimated angle-of-attack from a desired angle-of-attack to generate the first signal to represent the angle-of-attack error; and determine the desired angle-of-attack from a mach estimate, and wherein the airframe-state estimator generates the mach estimate, the estimated angle-of-attack, and the fifth signal.

22. The airframe of claim 20 wherein the control system comprises circuitry to, as part of non-linearly combining, raise a product of the first and second signals to an exponent to generate the third signal.

23. The airframe of claim 21 wherein the angle-of-attack is a difference between a flight-path angle and a body angle of the airframe, and wherein the control signal is used to control one or more of either fins or elevators to affect pitch of the airframe.

24. The airframe of claim 23 wherein the airframe comprises one of an aircraft, spacecraft, missile, or guided projectile.

* * * * *